United States Patent [19]

Beall

[11] Patent Number: 4,470,912

[45] Date of Patent: Sep. 11, 1984

[54] METHOD OF BREAKING EMULSIONS

[75] Inventor: Gary W. Beall, Austin, Tex.

[73] Assignee: Radecca, Inc., Austin, Tex.

[21] Appl. No.: 419,303

[22] Filed: Sep. 20, 1982

Related U.S. Application Data

[63] Continuation-in-part of Ser. No. 307,300, Sep. 30, 1981, abandoned.

[51] Int. Cl.$^3$ .............................................. B01D 15/00
[52] U.S. Cl. .................................... 210/691; 210/708
[58] Field of Search ............... 210/679, 680, 691, 708, 210/908, 924; 252/323, 428, 430

[56] References Cited

U.S. PATENT DOCUMENTS

| | | | |
|---|---|---|---|
| 2,015,260 | 9/1935 | De Groote | 252/323 |
| 2,367,384 | 1/1945 | Tymstra et al. | 210/925 |
| 3,046,233 | 7/1962 | Levy | 252/323 |
| 3,487,928 | 1/1970 | Canevari | 252/323 |

Primary Examiner—Ivars C. Cintins
Attorney, Agent, or Firm—Stefan J. Klauber

[57] ABSTRACT

A method is provided for treating polar or aqueous fluid emulsions of an organic composition. The method comprises contacting the emulsion with an emulsion-breaking amount of an organoclay to adsorb a major portion of the organic composition. Preferably, a portion of the water or polar fluid is then removed.

10 Claims, 1 Drawing Figure

4,470,912

METHOD OF BREAKING EMULSIONS

RELATED APPLICATIONS

This application is a continuation-in-part of my co-pending application Ser. No. 307,300, filed on Sept. 30, 1981, and entitled "Organoclay Waste Disposal Method", now abandoned. The entire disclosure of this parent application is incorporated herein by reference.

BACKGROUND OF INVENTION

1. Field of the Invention

This invention relates to a method for breaking emulsions of an organic composition and water or a polar fluid, and is particularly useful in the treatment of waste fluids.

2. Prior Art

One of the major problems facing cities, chemical manufacturers, and industries using various chemicals, is waste disposal. More particularly, cities and industries are often faced with the disposal of emulsions of organic contaminants. Typically, these are aqueous emulsions; however, there exists waste fluids which are emulsions of organic contaminants and polar fluids. In many of these operations, the disposal of water containing the contaminant substances is a problem. Regulations make it impossible to simply dump such waste water into streams, even if such method of disposal were desirable. Various methods have been proposed for removing such contaminants from waste water, but they have been relatively expensive or inefficient. Therefore, the removal of the contaminants from aqueous solutions, and in particular from waste water containing small amounts, is a problem which has not been completely solved.

It is often desirable to dispose of such waste fluids by reducing the volume of the fluid. When emulsions exist, this is often difficult to do, because prior to reducing the volume of the waste fluid, it is necessary to break the emulsion. Indeed, while it is often desirable to incinerate emulsions to dispose of them, such a process is normally very expensive due to the water present in the emulsion. This problem may be eliminated by breaking the emulsion to remove the water. Once the volume of the waste fluid is reduced, various means may be utilized to dispose of the remaining waste such as incineration or see, for example, assignee's co-pending application, U.S. Ser. No. 415,423, filed on Sept. 7, 1982, and entitled "Method of Immobilizing Organic Contaminants and Non-Flowable Matrix Produced Therefrom." This co-pending application relates to a method for treating waste fluids containing organic contaminants to solidify them in order to facilitate disposal. Prior to such solidification, however, it is desirable in some instances where emulsions are present, to reduce the volume of such fluid by breaking the emulsion and removing a portion of the water (or polar fluid) contained therein.

There exists numerous methods for breaking emulsions, typically oil and water emulsions. See for example the following U.S. Pat. Nos. 2,367,384 to Tymstra; 2,937,142 to Rios; 3,196,619 to Shock; 3,487,928 to Canevari; 3,528,284 to Skoglund et al; 3,986,953 to Beaucaire; 4,231,866 to Moser et al; and 4,279,756 to Weiss et al.

More specifically, Tymstra describes a method for removing small quantities of water-immiscible organic oily impurities from water. The method consists of contacting the oily composition with an inert solid coated with a cation surface-active bonding agent. The solid employed may be beach sand, mud flat deposits, silt, clay, limestone, silica, rice hulls, etc. The cationic surface-active bonding agent may be quaternary ammonium, phosphonium, arsonium, or primary, secondary, or tertiary organic amines or salts thereof. This reference does not teach or suggest the use of the specific organoclays utilized herein to break emulsions, nor the unexpected efficiencies of these clays in breaking emulsions.

Rios separates phenolic substances from aqueous solutions by contacting the aqueous solution with a clay adsorbent. The clay is previously treated by depositing carbonaceous material thereon, and then subjecting it to combustion regeneration to burn off the carbonaceous material.

Canevari separates droplets of oil from an aqueous phase, using a mixture comprising a sodium montmorillonite clay and an organic cationic agent or glycol. The organic cationic agent is preferably an amine. The mixture is applied as a flocculating clarifying solution containing from 1 to 5% of clay to water, and an effective amount of the organic cationic agent or glycol.

Beaucaire describes breaking an oil-water emulsion with waste-pickling acid solution, and thereafter converting the iron ions present in the waste-pickling solution to magnetite particles which absorb the oil. The magnetite particles and oil absorbed thereon are separated from the solution leaving a clarified solution.

Moser et al separates organic and aqueous phases by treatment of the emulsions with diatomaceous earth at an elevated temperature.

Weiss et al describes the use of a finely divided particulate mineral or clay material, the individual particles of which have been treated to produce a thin hydroxylated surface layer having a positive zeta potential at the adsorption pH.

None of the aforementioned references teach or suggest the use of organoclays to break emulsions of organic compositions and water or polar fluids.

Additionally, organoclays are well-known in the art, see for example the following U.S. Pat. Nos.: 2,531,427 to Hauser; 2,966,506 to Jordan; 3,422,185 to Kuritzkef; 3,974,125 to Oswald; 4,081,496 to Finlayson; and 4,105,578 to Finlayson et al.

None of these aforementioned references teach or suggest the use of these organoclays to break emulsions of organic compositions and water or polar fluids.

SUMMARY AND OBJECTS OF THE INVENTION

A method is provided for breaking emulsions of an organic composition and water or polar fluids. The method comprises contacting the emulsion with an emulsion-breaking amount of an organoclay to adsorb a major portion of the organic composition. Subsequently, a portion of the organoclay or water may be removed.

It is thus an object of this invention to provide a method of treating fluid waste, e.g. pools, streams, etc. to break the emulsions contained therein to facilitate disposal.

It is a further object of this invention to provide a method of treating both aqueous and polar fluid wastes containing such organic contaminants to facilitate disposal.

It is a further object of this invention to provide a method of treating fluid waste containing organic contaminants emulsified therein to "break" the emulsion, to permit removal of water to reduce the volume.

It is a further object of this invention to provide a method of treating fluid waste containing toxic organic contaminants emulsified therein to break the emulsion to permit the incineration or solidification of the toxic organics.

DETAILED DESCRIPTION OF THE INVENTION

Figure 1:
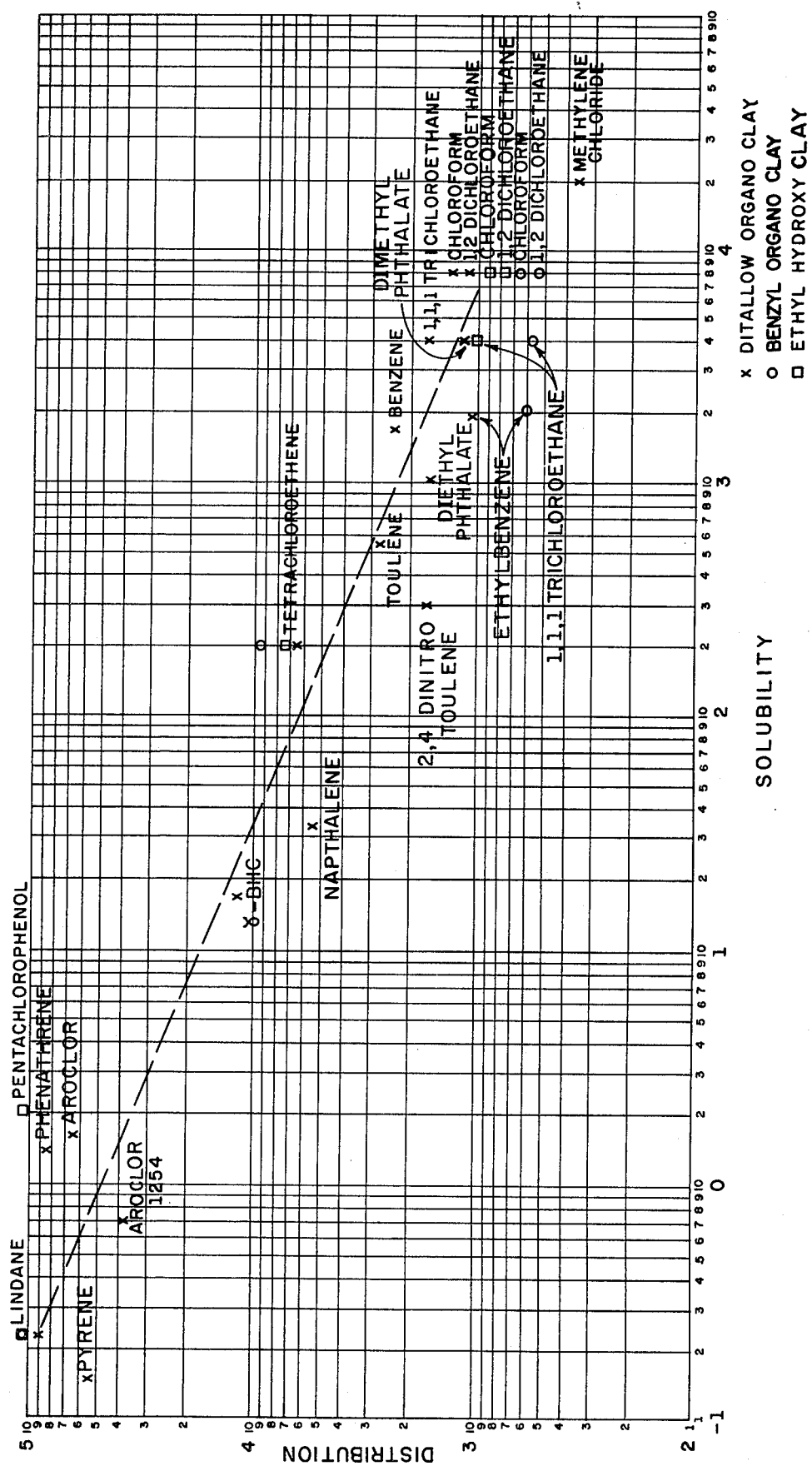
FIG. 1 shows the relationship of the logarithm of the distribution coefficient of certain organic contaminants with the logarithm of their solubilities in water.

Organoclays are well known in the art as exemplified by the aforementioned patents to Hauser, Jordan, Kuritzkey, Oswald et al, Finlayson, and Finlayson et al, the entire disclosures of which are incorporated herein by reference. In this invention, the term "organoclay" refers to various clay types, e.g. smectites, that have organo ammonium ions substituted for cations between the clay layers. The term "organo ammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite type clays, particularly the smectite type clays which have a cation exchange capacity of at least 75 milliequivalents per 100 grams of clay. Useful clays for such purposes include the naturally occuring Wyoming variety of swelling bentonite and similar clays, and hectorite, which is a swelling magnesium-lithium silicate clay. The clays, are preferably converted to the sodium form if they are not already in this form. This can be effected, by a cation exchange reaction with a soluble sodium compound. These methods are well-known in the art. Smectite-type clays prepared synthetically can also be utilized, such as montomorillonite, bentonite, beidelite, hectorite, saponite, and stevensite.

The organoclays useful in this invention include those set forth in U.S. Pat. No. 2,531,427 to Hauser. These organoclays are modified clays which exhibit in organic liquids, some of those characteristics which untreated clays exhibit in water. For example, they will swell in many organic liquids and will form stable gels and colloidal dispersions.

Generally, the quaternary ammonium salt substituted onto the clay has organic groups attached to the clay which will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e. dimethyl dioctododecyl 0:2, methyl benzyl dioctododecyl 1:2, dibenzyl dioctobenzyl 1:1, tribenzyl octadecyl 3:1, methyl dibenzyl octodecyl 2:1). The amount of alkyl ammonium salt substituted on the clay can vary between 0.5% to 50%.

In particular, the preferred organoclay used in this invention comprises one or more of the following quaternary ammonium cation modified montmorillonite clays:

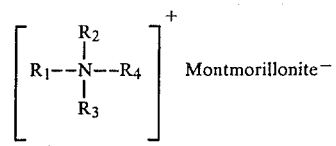

wherein $R_1$ is an alkyl group having at least 10 carbon atoms and up to, for example, 24 carbon atoms, and preferably having a chain length of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(hydrogenated tallow) ammonium bentonite; and more generally quaternary ammonium cation modified montmorillonite clays represented by the formula:

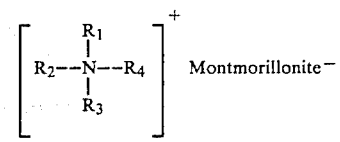

wherein $R_1$ is $CH_3$ or $C_6H_5CH_2$; $R_2$ is $C_6H_5CH_2$; and $R_5$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

The montmorillonite clays which may be so modified are the principal constituents of bentonite rock, and have the chemical compositions and characteristics described, for example, in Berry and Mason, "Mineralogy", 1959, pp. 508-509. Modified montmorillonite clays of this type (i.e. organoclays) are commercially available from Southern Clay Products, Inc., Gonzales, Tex. under such trade designations as Claytone 34 and 40, and are available from NL Industries, Inc., New York, N.Y. under such trade designations as Bentone 27, 34, and 38. The preferred organoclays utilized in this invention, are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methylbis (2-hydroxyethyl) octodecyl ammonium bentonite.

The fluid waste, which may be an aqueous waste or a waste fluid whose carrier fluid is a polar composition, e.g. aliphatic alcohol, etc. contains an amount of organic contaminant. Typical organic contaminants are the chlorinated organic compounds, e.g. DDT, BDD, DDE, 2, 4-dichloro-phenol, tetrachloroethylene, and other organics such as benzene, toluene, methylene chloride, chloroform, 1, 2 dichloroethane 1, 1, 1-trichloroethane, trichloroethylene, tetrachloro ethylene, 2-nitrophenol, pentachlorophenol, dimethy phthalate, Lindane, Arochlor-1254, ethyl benzene, HCP, parathion, dichlorobenzene, hexachlorocyclopentadiene, ethylparathion, 2, 4-dinitrotoluene, naphthalene, pyrene, etc.

In the method of this invention, a sufficient amount of the organoclay is added to the aqueous or polar fluid composition to break the emulsion and absorb substantially all of the organic contaminants on the organoclay. Preferably, the amount of organoclay is at least about one percent (1%) by weight of the amount of organic contaminant and most preferably at least about five percent (5%) by weight of the organic contaminant. If too little organoclay is used, the emulsion will not be sufficiently broken. The upper limit of organoclay is primarily dictated by cost. For general guidance, however, about ten percent (10%) by weight of the amount of the organic contaminant is a preferred upper limit.

The organoclay is mixed thoroughly with the fluid waste. The temperature at which the organoclay is mixed with the waste is not critical, with room temperature being preferred for obvious cost considerations.

The organoclay, upon mixing in the fluid waste, swells as the organic contaminant molecules are sorbed into and onto the organoclay. The organoclay additionally fixes the organic contaminant compounds through adsorption involving partitioning of the organic molecules of the contaminant into the organoclay.

The organic molecules of the contaminant preferably partition into the organic phase of the organoclay versus the aqueous phase or polar fluid phase of the fluid. The magnitude of organic partitioning of a given organic molecule into the organoclay over, for example, the aqueous phase can be predicted qualitatively by the solubility of the organic molecule in the aqueous phase. That is to say, an organic molecule that is very insoluble, e.g. oil, in an aqueous phase will partition very strongly into the organoclay relative to a more soluble organic molecule. This partitioning phenomenom also follows chromatagraphic theory which allows precise predictions of how organic molecules will migrate through a bed of organoclay. FIG. 1 shows the linear relationship of distribution co-efficients for several key organic species with three types of organoclay. The distribution coefficients equals the amount of organic adsorbed in the clay divided by the amount left in solution times the volume of the solution divided by the mass of the clay. The aqueous solution contains the organics listed in FIG. 1. Generally, the amount in solution depends on solubility.

The organoclay when added to the fluid waste composition tends to break organic contaminant-water emulsions. The organoclays are very effective at breaking emulsions at extremely low dose rates of organoclay. After the step of adding the organoclay, a portion of the water or polar fluid is removed, for example, by decanting or otherwise separating the fluid from the composition. Such procedure substantially reduces the volume of the waste fluid. The breaking of the emulsion is particularly useful if the waste is to be solidified, for less mass must be solidified when water is removed, and this therefore provides for decreased cost in transportation and disposal. The water can also be recovered for further use. Additionally, the water removal or decanting step provides for the waste being incinerated at considerable savings, since the BTU value of the waste has increased substantially by the exclusion of water. Still further, the organics left in the waste mass can be recovered for reuse and the organoclay regenerated.

Thus, the method of this invention provides for several advantages which include substantially reducing the volume and mass of a waste fluid. This yields substantial savings in transportation and disposal site costs. Additionally, the organic contaminant-water emulsion breaking by the use of the organoclays, permits water to be returned to the plant for further use. Removal of water also makes incineration more feasible since the organic contaminant has a high BTU value.

EXAMPLE I

The following Table contains examples of how the organoclay can break organic-water emulsions:

TABLE I

ORGANOCLAY APPLIED TO BREAKING OF ORGANIC WATER EMULSIONS

| Type of Emulsion | Composition (A) | Organoclay Dose (wt. % of A) | Percent of Water Recovered |
| --- | --- | --- | --- |
| Texaco API Separator Sludge | 60% organic, 40% water | 2.5% | 98% |
| Amoco API Separator Sludge | 80% organic, 20% water | 2.5% | 95% |
| BFI Lagoon Hazardous Waste | ⅓ solids, ⅓ organic, ⅓ water | 2.5% | 98% |
| Alcoa Rolling Mill Emulsion (oil emulsion from lubrication in rolling mills) | 10% solids, 40% organic 50% water | 7% | 90% |

The organoclay utilized in this example was a dimethyl di(hydrogenated tallow) ammonium bentonite product available from Southern Clay Products, Inc., Gonzales, Texas.

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended thereto.

What is claimed:

1. A method for breaking emulsions of an organic composition and water comprising contacting the emulsion with an emulsion-breaking amount of an organoclay to adsorb a major portion of the organic composition, said organoclay being the previously prepared solid reaction product of a quaternary ammonium salt and a smectite-type clay.

2. A method for breaking an emulsion of an organic composition and a polar composition comprising contacting the emulsion with an emulsion-breaking amount of an organoclay to adsorb a major portion of the organic composition, said organoclay being the previously prepared solid reaction product of a quaternary ammonium salt and a smectite-type clay.

3. The method of claims 1 or 2, further comprising removing a portion of the polar fluid or water.

4. The method of claims 1 or 2, wherein the organoclay is a higher dialkyl dimethyl ammonium organoclay.

5. The method of claims 1 or 2, wherein the organoclay is a benzyl ammonium organoclay.

6. The method of claims 1 or 2, wherein the organoclay is an ethylhydroxy ammonium organoclay.

7. The method of claims 1 or 2, wherein the amount of organoclay is at least about 1% by weight of the amount of organic composition.

8. The method of claim 7, wherein the amount of organoclay is a maximum of about 10% by weight of the amount of organic composition.

9. The method of claims 1 or 2, wherein the amount of organoclay is at least about 5% by weight of the amount of organic composition.

10. The method of claim 9, wherein the amount of organoclay is a maximum of about 10% by weight of the amount of organic composition.

* * * * *